US006997106B1

(12) United States Patent
Holopainen et al.

(10) Patent No.: US 6,997,106 B1
(45) Date of Patent: Feb. 14, 2006

(54) SHOE ROLL (75) Inventors: Kari Holopainen, Muurame (FI);
Markku Kyytsönen, Numminen (FI);
Hannu Pullinen, Riihimäki (FI); Aaron Mannio, Järvenpää (FI); Markku Kirvesmäki, Järvenpää (FI)

(73) Assignee: Metso Paper, Inc., Helsinki (FI)

( * ) Notice: Subject to any disclaimer, the term of this patent is extended or adjusted under 35 U.S.C. 154(b) by 317 days.

(21) Appl. No.: 10/070,024

(22) PCT Filed: Aug. 25, 2000

(86) PCT No.: PCT/FI00/00726

§ 371 (c)(1),
(2), (4) Date: Sep. 3, 2002

(87) PCT Pub. No.: WO01/16424

PCT Pub. Date: Mar. 8, 2001

(30) Foreign Application Priority Data

Aug. 27, 1999 (FI) .................................. 19991823
Feb. 21, 2000 (FI) .................................. 20000399

(51) Int. Cl.
*B30B 3/04* (2006.01)

(52) U.S. Cl. ................ 100/155 R; 100/161; 162/358.3

(58) Field of Classification Search ............ 100/155 R, 100/161–170, 331; 162/203, 205, 202, 358.3; 492/50
See application file for complete search history.

(56) References Cited

U.S. PATENT DOCUMENTS

| 4,332,191 A | | 6/1982 | Kankaanpaa |
| 5,419,242 A | * | 5/1995 | van Haag ..................... 100/47 |
| 5,590,593 A | | 1/1997 | Korhonen et al. |
| 5,662,037 A | * | 9/1997 | van Haag ..................... 100/331 |
| 5,897,476 A | | 4/1999 | Ehrola et al. |
| 5,938,895 A | | 8/1999 | Hirvonen |
| 5,947,017 A | * | 9/1999 | Hartwich et al. ........ 100/163 A |
| 6,039,840 A | | 3/2000 | Kytonen et al. |
| 6,248,215 B1 | | 6/2001 | Cramer et al. |
| 6,305,280 B1 | * | 10/2001 | Beckers ...................... 100/331 |

FOREIGN PATENT DOCUMENTS

| EP | 0363887 | 4/1990 |
| EP | 0 698 684 A1 | 2/1996 |
| EP | 0890676 | 1/1999 |
| FI | 100264 | 10/1997 |
| FI | 102552 | 12/1998 |
| GB | 2119422 | 11/1983 |
| WO | WO 99/63154 | 12/1999 |
| WO | WO 01/16424 | 3/2001 |

* cited by examiner

*Primary Examiner*—Derris H. Banks
*Assistant Examiner*—Jimmy Nguyen
(74) *Attorney, Agent, or Firm*—Stiennon & Stiennon (57) ABSTRACT A multi-roll calender, supercalender, soft calender or equivalent has at least one nip (YN, PN1, KN, PN2, AN) profiling a fibrous web (W) which is being calendered. A shoe roll (1, 4, 6, 10) constitutes at least one of the calender rolls which define the nip. A shell (11, 41, 61, 101) of the shoe roll is of a composite material, and the shoe roll is provided with internal shell-loading shoes (12, 42, 43, 62, 63, 103) for profiling the shell, the nip and/or the fibrous web.

17 Claims, 3 Drawing Sheets

SHOE ROLL

CROSS REFERENCES TO RELATED APPLICATIONS

This application is a U.S. national stage application of International Application No. PCT/FI00/00726, filed Aug. 25, 2000, and claims priority on Finnish Application No. 19991823 filed Aug. 27, 1999, and on Finnish Application No. 20000399, the disclosures of all of which applications are incorporated by reference herein.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to calendering of a fibrous web, such as a paper and board web.

Calendering is a method by means of which the properties, in particular the thickness profile, smoothness, gloss, surface porosity and translucence of a web-like material, such as a paper web, are sought to be generally improved. In calendering the paper web is passed into a nip which is formed between rolls pressed against each other and in which the paper web is deformed by the action of temperature, moisture and nip pressure, in which connection the physical properties of the paper web can be affected by controlling the above-mentioned parameters and the time of action. The good physical properties attained by calendering lead to better print quality, thereby bringing a competitive advantage to the manufacturer of paper.

Shoe and/or extended-nip calendering is calendering in a calender unit in which a nip is formed between a roll provided with a resilient shell, the shell of said roll being made, for example, of polyurethane, and a press roll or shoe roll which has a rigid shell and is provided with an internal loading shoe and which is made of metal, such as steel.

In a multi-roll calender, the paper web is calendered by passing the web through nips defined between calender rolls arranged one upon the other to form a stack of rolls. The rolls are mounted on the frame of the calender and they are arranged to be in nip contact with one another such that the paper web can be calendered by passing it through the nips and by arranging a given load between the rolls in order to provide a linear load in the nip. For example, Finnish patent 95062, which corresponds to U.S. Pat. No. 5,590,593, discloses a calender in which the two lowest rolls in a stack formed by four rolls are deflection-compensated rolls, advantageously zone-controlled rolls and they are mounted so as to be stationary, i.e. their bearing housings are rigidly suspended from supports mounted on the frame of the calender. The two topmost rolls, of which the highest one is also a deflection-compensated roll, preferably a zone-controlled roll, are mounted to be movable such that their bearing housings are attached to loading arms pivotally mounted by means of articulated joints on the frame of the calender. The highest deflection-compensated roll can be provided with a resilient coating and the second topmost roll is a heatable so-called thermo roll. The lowest deflection-compensated roll in the roll stack can also be provided with a resilient coating. The calender has alternative modes of operation, such as, for example, passing the paper web to be calendered through all three nips with the nips closed or, by opening the topmost nips, through only two or one nip, respectively. It is mentioned that the advantages include, among other things, the fact that the calender principally provides all the same advantages as are achieved by conventional soft calenders, in addition to which the middle nip in the calender is a hard nip, by means of which caliper can be equalized. Moreover, the modifiability of the calender makes it suitable for many paper grades.

Similar modifiable calenders are also disclosed in European application publication 890676 and in GB application publication 2,119,422. European application publication 890676 discloses a calender in which six rolls are attached to a frame to form a calender stack. The topmost roll is fixedly attached to the frame, the middle rolls are attached to loading arms, and the bottom roll is arranged in a carriage which can be displaced in a vertical direction in a guide. The topmost and lowermost rolls are deflection-compensated rolls, and the topmost and lowermost rolls as well as the two middle rolls are rolls provided with an elastic coating, while the second lowest roll and the second topmost roll are hard-surface rolls. It is typical of the calender that when the topmost and lowermost nips are closed, the other nips therebetween are open, so that the web can be calendered symmetrically by means of the topmost and the lowermost nip and conducted without calendering through the open nips and via the take-out rolls situated adjacent to the rolls which form the opened nips.

GB application publication 2,119,422 in turn relates to an arrangement in which two stacks of three rolls are placed adjacent to each other on the same calender frame, the middle roll in each of said stacks being a hard roll and fixedly mounted on the frame and the soft rolls situated on both sides of the middle roll being displaceable to an operating position into nip contact with the hard-surface roll and away from it. These rolls situated in both stacks above and beneath the hard roll are deflection-controlled rolls. One of the soft-surface rolls in each roll stack serves only as a spare roll, which can be employed when the soft-surface roll proper which is in nip contact, for instance, becomes damaged, and thus the calender operates in practice as a double nip calender formed by two roll pairs.

FIGS. 5D and 5E of U.S. Pat. No. 4,332,191 show a calender which comprises two stacks of three rolls placed one upon the other, in which the middle roll in the upper stack is a soft roll and all rolls in the lower stack are hard rolls. Moreover, the calender includes a stack of three rolls on the other side of the frame, the middle roll in the stack being soft. The web can be calendered by passing it via the stacks provided with a soft middle roll or, by lowering the bottom roll of the upper stack into contact with the lower stack, a stack of four hard rolls is provided, and the web is passed through three nips of said stack.

There is also known a soft calender under the name of OPTIGLOSS™, which comprises two separate sets of three rolls, in both of which the middle roll is a hard thermo roll and there is a soft-surface roll on both sides of it. This provides a calender having 6 rolls and 4 nips in all.

As described above, it is typical of all calender structures that nips are opened by means of loading arms or by displacing other support structures supporting the calender roll, such as a carriage supporting the roll in guides extending parallel to the roll stack. This is necessary in order that the nips may be opened when changing the mode of calendering, i.e. the number or location of the nips which are calendering, for example, when the paper grade to be produced is changed. Likewise, it is typical of previous arrangements, like EP890676, that the mode of calendering is changed by opening some of the nips and by passing the web through the remaining closed nips. This leads to the fact that many rolls have to be moved.

Shoe rolls are typically hydraulically deflection-compensated, zone-controlled rolls in which the shell is supported from a non-rotating central shaft of the roll by means of a hydrostatic loading arrangement, such as a row of loading shoes, which transfer the nip force acting on the shell rotating around the central shaft so as to be carried by the central shaft. The loading element is generally also divided into zones, in which connection the loading pressure can be regulated as required by profiling. The zoning in this kind of zone-controlled shoe roll may comprise individual elements of the loading arrangement, in which connection the number of zones in the roll and in the loading arrangement may exceed 60—as examples may be mentioned the shoe rolls marketed by the Metso Paper, Inc. under the trademarks SymCD™ and SymCDS™, or the zoning may comprise a group of individual elements of the loading arrangement, in which connection the roll and the loading arrangement normally comprise eight zones—as examples may be mentioned the shoe rolls marketed by Metso Paper, Inc. under the trademarks SymZ™, SymZS™, SymZL™, and SymZLC™.

Shoe and/or extended-nip calendering has generally been found to be good for producing low-gloss paper grades, i.e. having a Hunter gloss % below 40, by calendering. When higher gloss is required, the nip pressure is, however, not sufficient to provide gloss. With ever-increasing running speeds, calendering is becoming a bottleneck in the papermaking process, and satisfactory quality is not achieved by today's machine calender units. Some of the drawbacks of the present papermaking process are also that the loss of bulk increases when gloss is improved, and
in order to provide sufficient quality, it is necessary to use webs with an abundance of coating and/or to use off-line calendering, in particular multi-nip calendering, the known application of which is supercalendering, and/or soft calendering.

Figure 1:
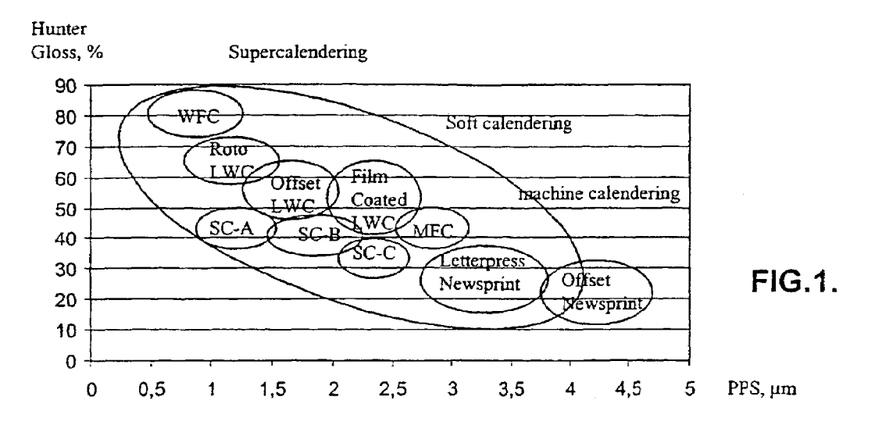
FIG. 1 shows how different printing paper grades are calendered today and, in particular, the direction in which the calendering technology is heading in the near future.

The direction in the calendering technology is to an ever increasing degree towards on-line solutions even when the intention is to manufacture higher quality printing paper grades, such as SC and glossy coated papers. FIG. 1 illustrates how different printing paper grades are calendered today and, in particular, it can be seen where the calendering technology is heading in the near future.

a. Machine calendering is calendering in a calender unit in which nips are formed between non-resilient smooth-surface metal rolls placed one upon the other. The width of the nip in a machine calender is typically very small and the nip load in the nips is relatively high.

b. Multi-roll calendering, the known applications of which include supercalendering and, for producing SC-A and LWC grades in particular, a multi-roll on-line or off-line calender which provides in off-line operation in practice the best result in terms of quality, is calendering in a calender unit in which nips are formed between a smooth-surface metal or cast iron roll and a roll coated with a resilient coating, such as a paper or polymer roll, in which connection a wide nip is formed. The resilient-surface roll conforms to the contours of the surface of paper and presses the opposite side of paper evenly against the smooth-surface metal roll. Because of the resilient-surface roll, the calendering time is also longer, wherefore in order to assure adequate capacity, the paper machine must be equipped today even with three multi-roll calenders. In a multi-roll calender there are today typically from one to two sets of rolls and 10 to 12 nips. For the purpose of treating both sides of the web, the supercalender comprises a so-called reversing nip in which there are two resilient-surface rolls placed against each other. The linear load in the multi-roll calender increases from the top nip to the bottom nip because of the gravity of the earth. By using relief of the rolls, this increase in load can be compensated for. This kind of multi-roll calender provided with the relieving of the rolls is the multi-roll calender marketed by Metso Paper, Inc. under the trademark OptiLoad™.

c. Soft calendering is calendering in a calender unit in which nips are formed in a manner similar to that of a multi-roll or supercalender between a smooth-surface metal roll and a roll covered with a resilient coating, in which connection a wide nip is formed. In a soft calender, each nip is formed between separate roll pairs, in which connection the nip load in individual nips can be adjusted in each individual nip, or between roll pairs in separate sets of rolls, in which connection the nip load can be adjusted in each individual set of rolls. The soft calender can be used as an on-line calender and it can replace the machine calenders of a paper machine. In order to treat both sides of the web in the calender, the order of the roll pairs or of the sets of rolls forming the successive nips is reverse with respect to the web such that the resilient-surface roll or the resilient-surface rolls can be caused to work on both surfaces of the web.

SUMMARY OF THE INVENTION

One object of the present invention is to eliminate or at least minimize the weaknesses and drawbacks associated with today's multi-roll calendering and to provide a new type of intermediate and/or middle roll for a multi-roll calender in order to improve the profileability of a fibrous web in the nips of a multi-roll calender, such as a multi-nip on-line or off-line calender, supercalender and/or soft calender. Another object of the present invention is to provide a calender that can be modified in a new, simple manner.

In the shoe roll according to the invention, the shoe rows loading and profiling the shell of the shoe roll are arranged in the direction of the nips of the shoe roll, and the shell of the shoe roll is made of a composite material, the properties of which are selected with a fibre orientation such that the shell is more rigid in the circumferential direction than in the axial direction.

The calender according to one embodiment of the invention comprises two stacks of three rolls placed one upon the other, the rolls of the stacks being displaceable so as to provide one operation nip between the middle rolls or two operation nips in both stacks.

Both of the stacks of three rolls placed one upon the other in the same calender frame of the calender have advantageously a thermo roll in the middle and a soft-surface roll above and underneath. The soft-surface rolls are advantageously rolls provided with a movable shell, which means that they can be displaced in the direction of the nip plane by displacing the shells in the radial direction. The movable-shell rolls are fixedly attached to the frame of the calender. In that connection, the lower movable-shell roll in the upper roll stack and the upper movable-shell roll in the lower roll stack can be moved by displacing the shells into nip contact with each other and apart from nip contact with the middle roll of the upper roll stack and the middle roll of the lower roll stack, respectively. Likewise, the top roll in the upper roll stack and the bottom roll in the lower roll stack can be displaced by means of a movement of the roll shell taking place in the direction of the nip plane apart from the middle roll and back into nip contact with the middle roll. The rolls are fixedly attached to the frame at such distances from one another that all the nips can be opened by means of movements of the movable-shell rolls.

With respect to the advantages of the shoe roll according to the invention it may be mentioned that the loading of the nip can be simultaneously changed by means of individual shoes or a group of shoes of the shoe rows which are loading the shell of the shoe roll and which are spaced from one another in the circumferential direction, i.e. the load of the nip can be increased and/or reduced, thereby providing successive nips which profile in the same way and enhance the result of calendering. The invention also makes it possible that all the nips of a multi-roll calender can now be made profiling nips by means of the shoe roll and that the top and/or the bottom roll of a multi-roll calender, such as a supercalender, can now be made a profiling top and/or bottom roll.

In accordance with an embodiment of the invention regarded as particularly advantageous, the composite material is advantageously selected from a group which includes: continuous-fibre reinforced plastic; glass fibre; a composite of carbon fibres and/or epoxy.

In order that the shell should be more rigid in the circumferential direction than in the axial direction, in an embodiment of the invention considered advantageous, the fibre orientation of the composite material has been accomplished such that a major proportion of the fibres has been wound at an angle of over 45° with respect to the axis of the roll. Advantageously, this winding angle is in the range of 70°–90°.

The invention enables the calender to be modified only by arranging the middle rolls (the top roll in the lower roll stack and the bottom roll in the upper roll stack) into nip contact with each other and apart from each other into nip contact with the middle roll of their own stack. This allows, for example, symmetric calendering to be accomplished in four nips formed by hard-surface and soft-surface rolls while the nip formed between the top calender roll of the lower stack and the bottom roll of the upper stack is open, or matte calendering to be accomplished by passing the web out of the calender through the closed nip between the bottom roll of the upper stack and the top roll of the lower stack. By dimensioning the positioning of the roll shafts, the diameters of the roll shells and the distances of the radial movement of the roll shells in a suitable manner, the change can be accomplished only by displacing roll shells, i.e. separate transfer devices for displacement of the entire roll are not needed.

With respect to the advantages of other details and the structural details of the invention, reference is made to the dependent claims of the accompanying set of claims.

BRIEF DESCRIPTION OF THE DRAWINGS

In the following, the invention will be described in more detail with reference to the accompanying patent drawings, in which.

DESCRIPTION OF THE PREFERRED EMBODIMENTS

In the multi-roll calender shown in FIG. 2, the run of a fibrous web which is being calendered is as follows. The fibrous web W which is calendered enters a top nip YN between a top roll 1 of the multi-roll calender and an upper rigid-shell press roll 2 provided with a smooth-surface metal or chilled shell 21, from which nip the fibrous web W runs around a guide member 3 (e.g. a guide roll) into an upper profiling nip PN1 between the rigid-shell press roll 2 and an upper intermediate or middle roll 4 according to the invention, which roll is a shoe roll provided with a shell 41 of a composite material, after which the fibrous web W runs around a guide member 5 (e.g. a guide roll) into a reversing nip KN between the upper middle roll 4 according to the invention, which roll is a shoe roll, and a lower intermediate or middle roll 6 according to the invention, which roll is a shoe roll and also has a shell 61 of a composite material, after which the fibrous web W runs around a guide member 7 (e.g. a guide roll) into a lower profiling nip PN2 between a lower middle roll 6 according to the invention, which roll is a shoe roll, and a lower rigid-shell press roll 8 provided with a smooth-surface metal or chilled shell 81, after which the fibrous web W runs around a guide member 9 (e.g. a guide roll) into a bottom nip AN between the lower rigid-shell press roll 8 and a bottom roll 10 of the calender.

The upper middle roll 4 according to the invention comprises, according to the invention, a composite shell 41 and an upper shoe row 43 and a lower shoe row 42 which are arranged both at the profiling nip PN1 and at the reversing nip KN and which load and profile the upper profiling nip PN1 of the fibrous web, the reversing nip KN of the fibrous web and the composite shell 41. The lower middle roll 6 is substantially identical with the upper middle roll 4. Thus, the lower middle roll 6 comprises, according to the invention, a composite shell 61 and an upper shoe row 62 and a lower shoe row 63 which are arranged both at the reversing nip KN and at the profiling nip PN2 and which load and profile the reversing nip KN of the fibrous web, the lower profiling nip PN2 and the composite shell 61.

Figure 2:
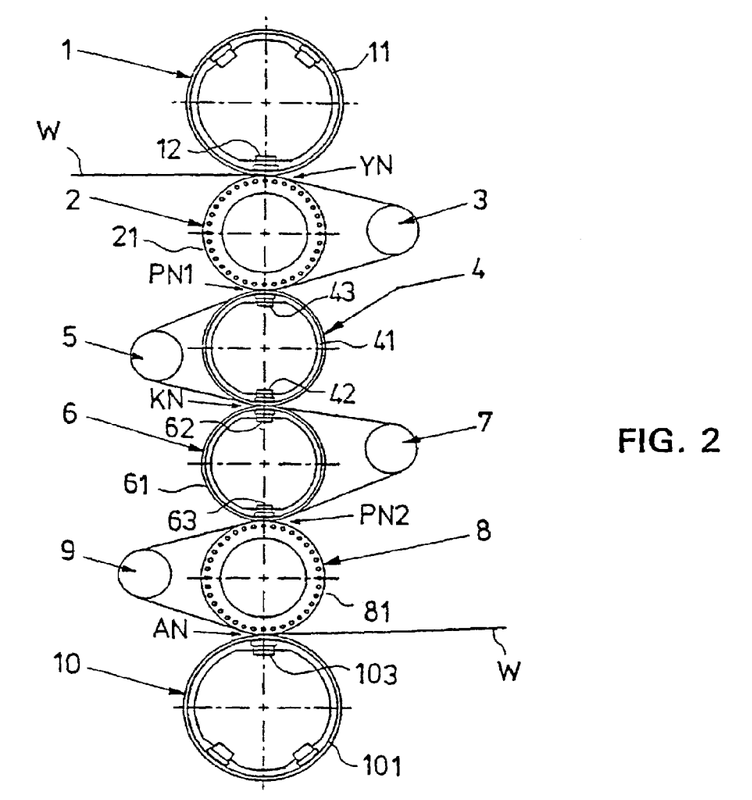
FIG. 2 is a schematic sectional view of a multi-roll calender.

In order to provide successive profiling nips, which profile in the same way and enhance the result of calendering, the reversing nip KN in the multi-roll calender is preceded by at least one profiling nip PN1 (as shown in FIG. 2) in which the metal or chilled shell 21 of the upper rigid-shell press roll 2 and the composite shell 41 of the upper middle roll 4 according to the invention are placed against each other. In addition, for the purpose of enhancing the result of calendering, the reversing nip KN is followed by at least one profiling nip PN2 (as shown in FIG. 2) in which the composite shell 61 of the lower middle roll 6 according to the invention and the metal or chilled shell 81 of the lower rigid-shell press roll 8 are placed against each other.

In accordance with the invention, the properties of the composite material are selected with a fibre orientation such that the composite shell 41, 61 is considerably more rigid in the circumferential direction than in the axial direction, with the result that by changing the load of the shoe rows 42, 43, 62, 63, the profiles of the composite shell 41, 61, the profiling nip NP1, NP2 and/or the reversing nip KN can be changed. In that connection it becomes possible, among other things, to control the nip spacing and thus the linear load in the profiling nip PN1, PN2 and/or in the reversing nip KN and to correct any profile errors caused by different deflections of the rolls defining the nip by changing the profile of a roll shell or roll shells.

In order to make all the nips of the calender such that they can be profiled and that they profile the fibrous web W, in the embodiment shown in FIG. 2, in addition to the middle rolls 4 and 6, shells 11 and 101 of the top roll 1 and the bottom roll of the calender, respectively, have also been made of a composite material, which is advantageously the same composite material as the composite material of the shells of the middle rolls 4, 6. Since the top and bottom rolls 1, 10 have also been provided with an internal shoe row 12, 103 loading the shell, the profiles of the composite shell 11, 101, the top nip YN and/or the bottom nip AN can be changed by changing the load of the shoe rows 12, 103. In that connection it becomes possible, among other things, to control the spacing of the nip YN, PN1, KN, PN2, AN and to correct any profile error caused by different deflection of the upper and lower rolls defining the nip by changing the profile of the roll shell.

In accordance with an embodiment of the invention regarded as particularly advantageous, the composite material is selected from a group advantageously including: continuous-fibre reinforced plastic; glass fibre; a composite of carbon fibres and/or epoxy.

In order that the shell should be more rigid in the circumferential direction than in the axial direction, in an embodiment of the invention considered advantageous, the fibre orientation of the composite material has been accomplished such that a major proportion of the fibres has been wound at an angle of over 45° with respect to the axis of the roll 1, 4, 6, 10. Advantageously, this winding angle is in the range of 70°–90°.

The shoe roll 1, 4, 6, 10 according to the invention is advantageously a hydraulically zone-controlled top roll, intermediate roll, middle roll or bottom roll of a calender, the composite shell 11, 41, 61, 101 of which roll is supported from a non-rotating central shaft 66 of the roll by means of a hydrostatic loading arrangement 12; 42; 43; 62; 63; 103, such as a row of loading shoes which transfer the nip force acting on the composite shell rotating around the central shaft 66 so as to be carried by the central shaft.

Figure 3:
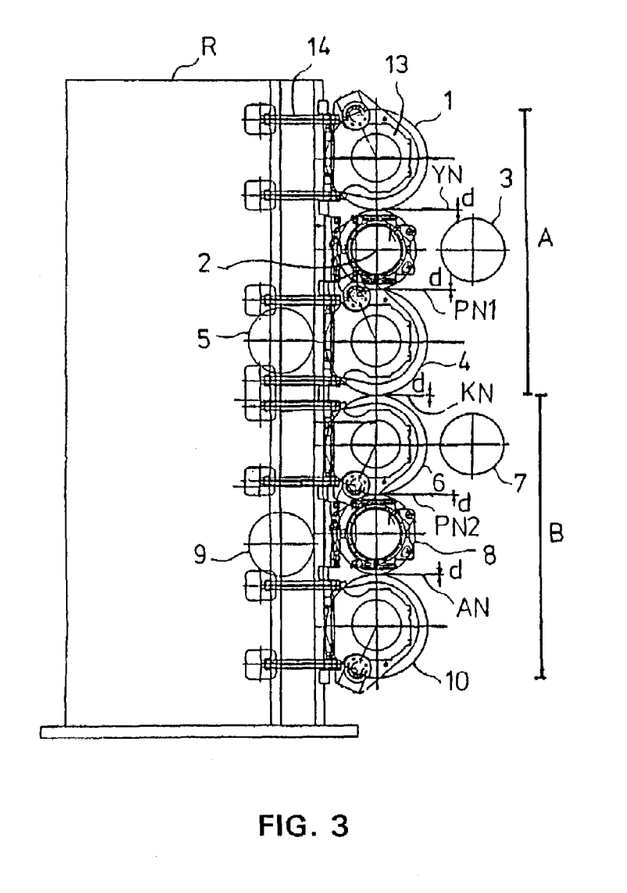
FIG. 3 is a side view of a calender with nips open.

FIG. 3 is a side view of a calender. Six rolls are placed one upon the other on a frame R of the calender, said rolls forming two stacks A and B of three rolls. In the upper roll stack A, the top and bottom rolls 1 and 4 are rolls provided with a movable shell, the shells of said rolls being displaceable in the radial direction in the direction of the nip plane passing through the axes of rotation of the rolls. The roll shells of said rolls 1 and 4 are soft-surface shells, for example, provided with a polymer coating. Between the top and bottom rolls 1, 4 there is a hard heatable roll 2, i.e. a so-called thermo roll. The surface of this middle roll 2 can be, for example, a smooth metal surface.

In the lower roll stack B, in which the nip plane of the rolls is a continuation of the nip plane of the upper roll stack A, there are rolls which are identical with and in the same order as the rolls in the upper roll stack A, i.e. a middle hard heatable thermo roll 8 and, above and beneath it, a soft-surface movable-shell roll 6 and 10, respectively.

The movable-shell rolls 1, 4, 6, and 10 are so-called Sym-rolls, inside which there are loading members applying a force in a radial direction, which members are located on a stationary shaft and distributed in different zones across the machine width and by means of which the roll shell can be displaced in a radial direction and, in particular, in the direction of the nip plane in order to open and close the nip formed by the roll and to load the roll in a controlled manner.

The movable-shell soft rolls 1, 4, 6, and 10 in both roll stacks A, B have all identical measures and structure, and the middle rolls 3 and 8 in both roll stacks A, B have identical measures and structure, with the result that only two types of rolls need be arranged as spare parts for the calender.

The movable-shell rolls 1, 4, 6, and 10 are attached to the roll frame R by means of supports 13 which have substantially fixed positions and which support the stationary shaft of the roll at both ends. Even though FIG. 3 shows a horizontal bolt 14 for attaching the supports 13 to the calender frame R, other means of attachment can also be used by which the supports can be arranged to be in a fixed position on the frame. The bearing housings of the middle rolls 4 and 6 of the roll stacks A, B can be attached to the frame R by means of articulation supports and said rolls can be relieved hydraulically according to the known principles concerning sets of articulation rolls at both ends by means of a hydraulic cylinder acting between the bearing housing and the frame.

The rolls are placed in two superimposed stacks A, B such that the movable-shell rolls 1, 4, 6, and 10 can be displaced apart from the middle hard rolls 2 and 8, and the bottom roll 4 of the upper roll stack and the top roll 6 of the lower roll stack are not in contact with each other, in which connection all the nips YN, PN1, KN, PN2, AN from top to bottom are open. FIG. 3 shows this situation. The distance d between the roll shells in the nips can be a few millimeters, for example, below 10 mm.

Figure 4:
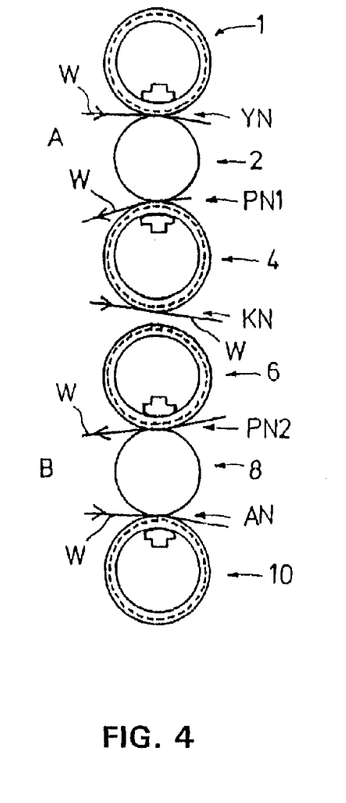
FIG. 4 shows a calender in a first running situation.

FIG. 4 shows a first running situation in which both nips YN, PN1 and PN2, AN of each roll stack A, B are closed, i.e. a calendering nip is formed on both sides of the heated thermo roll 2, 8 with the respective soft-surface roll 1, 4, 6, and 10. In other words, the web which is being calendered is run through four nips in total, which are all nips formed by a soft-surface roll and a hard heated roll. Between the roll stacks, the web runs through the open nip KN. The web will also be calendered symmetrically, i.e. in the first roll stack, the first surface is against a hard hot-surface roll and, in the next stack, the opposite surface is against a hard hot-surface roll. By regulating load and/or temperature, the different sides can also be treated differently in the successive roll stacks A, B.

Figure 5:
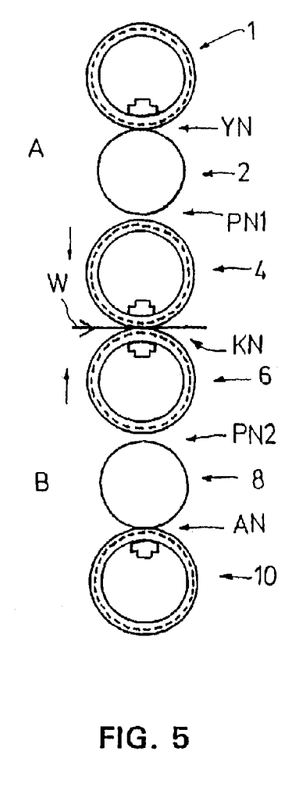
FIG. 5 shows the calender in a second running situation.
Figure 6:
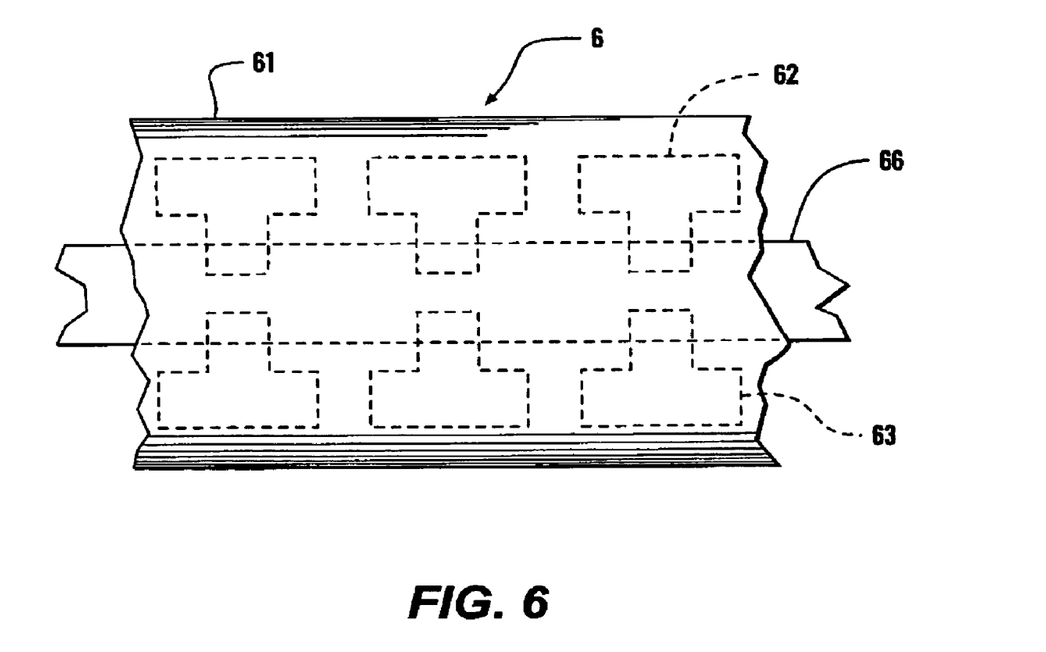
FIG. 6 shows a fragmentary schematic side view of the calender of FIG. 5.

FIG. 5 shows a second running situation in which the bottom roll 4 in the upper roll stack A and the top roll 6 in the lower roll stack B have been moved apart from the middle roll 2 and 8 of the respective roll stack, i.e. they have been moved into contact with each other in the direction of the nip plane in order to close the space left between the roll stacks, whereby the calendering nip KN is formed which is defined by a soft-surface roll on both sides. In this mode of running, the web to calendered is passed only through this nip KN in order to implement matte calendering. In this running mode, the rolls 4 and 6, Sym-rolls, are turned through 180° such that the loading members are placed at the calendering nip KN. If either roll or both rolls is/are provided with two series of loading members located inside the roll shell at a distance of 180° from each other, the roll need not be turned.

The nip KN can also be formed such that the bottom roll 10 of the lower stack B and the middle roll 8 attached to the frame by means of articulation supports are lowered, with the result that the nip PN2 becomes free, and the bottom roll 4 of the upper stack A is lowered to form the nip KN.

No separate loading cylinders are needed in the calender because loading can be accomplished by means of the loading members located inside the shells of the Sym-rolls (soft-surface rolls 1, 4, 6, 10).

FIGS. 3–5 also show take-out rolls 3, 5, 7, 9 typical of the calender, by means of which the web W which is being calendered can be taken out of the nips and which have been placed on both sides of the roll stacks A,B.

On-line calendering of paper is advantageously accomplished by means of the calender described above, in which connection it can be placed in a papermaking line. The calender is short in the machine direction, with the result that it is easy to place in an existing line, for example, in connection with rebuilds. Moreover, a change of the mode of running from the mode of calendering shown in FIG. 4 to the mode of calendering shown in FIG. 5 and vice versa is easy to accomplish.

Above, the invention has been described only by way of example by means of one of its embodiments regarded as advantageous. This is, of course, not intended to limit the invention and, as is clear to a person skilled in the art, many different alternative solutions and modifications are feasible within the inventive idea and its scope of protection defined in the accompanying claims. The wide usability of the present invention in almost all kinds of calendering applications, with the exception of pure machine calendering, shall be particularly noted.

The shoe roll provided with a composite shell according to the invention enables the calender to be run and used with different nip combinations. Some of the nips can be kept open. For example, in the case shown in FIG. 2, the nips AN and PN2 can be left open, in which connection the web W is passed directly from the knip KN to reeling. In that connection, the calender shown in FIG. 2 can be arranged to comprise two nips by feeding pressure only for the shoe 43 in the roll 4 and leaving the shoe 42 without pressure. Thereby, a calender is provided which has two successive nips profiling the web W on the same side. When the shoes 12 and 43 above and beneath the nips YN and PN1 are simultaneously pressed or relieved, two successive nips can be provided which profile the web W in the same way, which enhances the outcome.

What is claimed is:

1. A calender having a plurality of calender rolls arranged one upon the other, and including a top calender roll and a bottom calender roll, and defining in operation at least one profiling nip for profiling a fibrous web that is being calendered, at least one of the calender rolls defining the profiling nip being a shoe roll comprising an outer shell and at least one row of internal shell-loading shoe means for profiling the shell, the nip and the fibrous web as well as for controlling contact in the nip, the improvement comprising:

the shoe roll is located between the top and bottom calender rolls;

the shoe roll outer shell is of continuous-fibre reinforced composite material, the fiber orientation being such that the composite material outer shell is more rigid in the circumferential direction than in the axial direction; and the at least one row of internal shell-loading shoe means of the shoe roll is arranged parallel to a nip defined against the shoe roll.

2. The calender of claim 1 wherein the plurality of calender rolls further comprises a first press roll below the upper roll, and a first intermediate roll below the first press roll, and a second press roll above the bottom calender roll, and a second intermediate roll above the second press roll, and wherein both the first intermediate roll and the second intermediate roll are shoe rolls.

3. The calender of claim 1 wherein there are a plurality of rows of internal shell-loading shoe means within the shoe roll, the rows being uniformly spaced with respect to one another in the circumferential direction of the composite material outer shell.

4. The calender of claim 1 wherein the top calender roll is a shoe roll.

5. The calender of claim 1 wherein the bottom calender roll is a shoe roll.

6. The calender of claim 1, wherein the continuous-fibre reinforced composite material includes plastic or epoxy reinforced by glass fibres or carbon fibres, and that in order to provide a shell which is more rigid in the circumferential direction in relation to the axial direction of the shoe roll, orientation of the fibres of the composite material has been accomplished such that a major proportion of the fibres of the composite material of the shell of the shoe roll are directed at an angle of over 45' with respect to the axis of the shoe roll.

7. The calender of claim 6, wherein the angle is in the range of 70°–90°.

8. The calender of claim 1 wherein the shoe roll is a hydraulically zone-controlled roll, the composite shell of which is supported from a non-rotating central shaft of the shoe roll by means of hydrostatic loading arrangements which transfer the nip force directed at the composite shell rotating around the central shaft so as to be carried by the central shaft.

9. The calender of claim 8 wherein the hydrostatic loading arrangements comprise rows of loading shoes.

10. The calender of claim 1 wherein the calender has at least one intermediate roll positioned between the calender top roll and the calender bottom roll, and wherein at least one of the top roll, the at least one intermediate roll, and the bottom roll is a shoe roll.

11. The calender of claim 1 wherein in calender operation, the shoe roll is separable from a nip forming contact with a press roll or another shoe roll.

12. The calender of claim 1 wherein the plurality of calender rolls comprises two stacks of three rolls, one of the two stacks defining an upper stack the top roll being the uppermost roll of the upper stack, and the other of the two stacks defining a lower stack, the lower roll being the lowermost roll of the lower stack, the upper stack being placed upon the lower stack such that between the two stacks there remains a space which is defined by a lower roll of the upper stack and by an upper roll of the lower stack, the shoe roll being one of the upper stack lower roll and the lower stack upper roll, wherein the bottom roll of the upper stack and the top roll of the lower stack can be separated from contact with rolls of their own roll stack into nip contact with each other.

13. The calender of claim 12 wherein the bottom roll of the upper stack and the top roll of the lower stack are shoe rolls having roll shells, and at least the bottom roll of the upper roll stack and the top roll of the lower roll stack are fixedly mounted on a calender frame such that their shells can be displaced in the direction of the roll stack with respect to roll supports of the rolls.

14. The calender of claim 13 wherein at least the bottom roll of the upper roll stack and the top roll of the lower roll stack are provided with loading members located inside their roll shells.

15. A calender for treatment of a fibrous web passing therethrough, the calender comprising:

a frame;

a top roll mounted to the frame;

a first press roll mounted to the frame beneath the top roll;

a first intermediate roll mounted to the frame beneath the first press roll, wherein the top roll, the first press roll, and the first intermediate roll comprise a first roll stack;

a second intermediate roll mounted to the frame beneath the first intermediate roll;

a second press roll mounted to the frame beneath the second intermediate roll;

a bottom roll mounted to the frame beneath the second press roll, wherein the second intermediate roll, the second press roll, and the bottom roll comprise a second stack; and wherein the first intermediate roll and the second intermediate roll are shoe rolls, each having outer shells of continuous-fibre reinforced composite material, the fiber orientation being such that the composite material outer shell is more rigid in the circumferential direction than in the axial direction, and each having at least one row of internal shell-loading shoe means, the shoe means being operable to load the first intermediate roll against the first press roll and the second intermediate roll against the second press roll, or alternatively to load the first intermediate roll against the second intermediate roll.

16. The calender of claim 15 wherein the first intermediate roll and the second intermediate roll are fixedly mounted on the frame such that their shells can be displaced in the direction of the first roll stack or the second roll stack respectively with respect to roll supports of the rolls.

17. A multi-roll calender for calendering a fibrous paper web, the calender comprising a plurality of rolls arranged one upon the other and defining in operation at least one profiling nip for profiling the fibrous paper web;

wherein at least two of said plurality of rolls are intermediate calender rolls located between a top calender roll and a bottom calender roll of the multi-roll calender, wherein the at least two intermediate calender rolls are shoe rolls, and wherein each shoe roll defines at least one profiling nip together with another calender roll, each shoe roll comprising a non-rotating central shaft, a shell rotating around the central shaft, and at least one row of internal shell-loading shoes being supported on the central shaft so that the at least one row is arranged in the plane of the at least one profiling nip;

wherein two of the at least two intermediate calender rolls which are shoe rolls are superimposed and have a shell of a fibre reinforced composite material, the fiber orientation being such that the composite shell is more rigid in the circumferential direction than in the axial direction, said shell being displaceable in relation to the central shaft in order to separate the two superimposed intermediate shoe rolls from a nip forming contact with another calender roll or another shoe roll in calender operation.

* * * * *

UNITED STATES PATENT AND TRADEMARK OFFICE
CERTIFICATE OF CORRECTION

PATENT NO.   : 6,997,106 B1                                                Page 1 of 1
DATED        : February 14, 2006
INVENTOR(S)  : Kan Holopainen et al.

It is certified that error appears in the above-identified patent and that said Letters Patent is hereby corrected as shown below:

Column 10,
Line 20, "angle of over 45' with respect" should be -- angle of over 45° with respect --.

Signed and Sealed this

Twenty-fifth Day of April, 2006

JON W. DUDAS
*Director of the United States Patent and Trademark Office*